United States Patent
Lodha et al.

(10) Patent No.: US 12,190,402 B2
(45) Date of Patent: Jan. 7, 2025

(54) SELF-LEARNING BASED MECHANISM FOR VEHICLE UTILIZATION AND OPTIMIZATION

(71) Applicant: Tata Consultancy Services Limited, Mumbai (IN)

(72) Inventors: Kritika Lodha, Mumbai (IN); Pranav Shah, Mumbai (IN); Sudhakara Deva Poojary, Mumbai (IN); Neelesh Vishwakarma, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 323 days.

(21) Appl. No.: 17/419,661

(22) PCT Filed: Dec. 30, 2019

(86) PCT No.: PCT/IN2019/050964
§ 371 (c)(1),
(2) Date: Jun. 29, 2021

(87) PCT Pub. No.: WO2020/141547
PCT Pub. Date: Jul. 9, 2020

(65) Prior Publication Data
US 2022/0076369 A1    Mar. 10, 2022

(30) Foreign Application Priority Data

Dec. 31, 2018  (IN) .............................. 201821049921

(51) Int. Cl.
*G06Q 50/40* (2024.01)
*G06F 16/23* (2019.01)
(Continued)

(52) U.S. Cl.
CPC .......... *G06Q 50/40* (2024.01); *G06F 16/2379* (2019.01); *G06Q 10/06315* (2013.01); *G08G 1/202* (2013.01)

(58) Field of Classification Search
CPC ...... G06Q 10/047; G06Q 10/02; G06Q 50/30; G06Q 10/063116; G08G 1/123;
(Continued)

(56) References Cited

U.S. PATENT DOCUMENTS 6,430,539 B1     8/2002  Lazarus et al.
10,147,325 B1 * 12/2018  Copeland ............... G08G 1/202
(Continued)

FOREIGN PATENT DOCUMENTS

WO    WO-2020139324 A1 *  7/2020  ......... G01C 21/3415

OTHER PUBLICATIONS

W. Herbawi et al., "The ridematching problem with time windows in dynamic ridesharing: A model and a genetic algorithm," 2012 IEEE Congress on Evolutionary Computation, Brisbane, QLD, Australia, 2012, pp. 1-8, doi: 10.1109/CEC.2012.6253001 < https://ieeexplore.ieee.org/document/6253001?source=IQplus> (Year: 2012).*
(Continued)

*Primary Examiner* — Jerry O'Connor
*Assistant Examiner* — Michael R Koester
(74) *Attorney, Agent, or Firm* — FINNEGAN, HENDERSON, FARABOW, GARRETT & DUNNER LLP (57) ABSTRACT

There is no mechanism for vehicle utilization and optimization through continuous and incremental planning which ensures that transportation plans are based on real-time conditions. The present invention discloses systems and methods for vehicle utilization and optimization based on self-learning mechanism. A machine learning model for dynamic association of users to vehicles is provided that
(Continued)

learns previously clubbed patterns of users with their corresponding locations. The learnt previously clubbed patterns are utilized for determining association between previously clubbed locations which is further utilized to obtain an optimal set of locations. The users are dynamically associated to vehicles allocated for the obtained optimal set of locations by honoring one or more social and vehicle constraints. The proposed system has self-learning capability which ensures effective vehicle utilization and optimization in real time.

7 Claims, 3 Drawing Sheets

(51) Int. Cl.
*G06Q 10/0631* (2023.01)
*G08G 1/00* (2006.01)

(58) Field of Classification Search
CPC .... G06F 16/951; G01C 21/3438; H04W 4/02; H04W 4/023; B60R 25/1004
See application file for complete search history.

(56) References Cited

U.S. PATENT DOCUMENTS

| | | |
|---|---|---|
| 2003/0135304 A1 | 7/2003 | Sroub et al. |
| 2008/0091481 A1 | 4/2008 | Messa et al. |
| 2013/0310072 A1 | 11/2013 | Diem |
| 2016/0180274 A1 | 6/2016 | Zwakhals et al. |
| 2016/0321566 A1* | 11/2016 | Liu .................... G05D 1/0011 |
| 2016/0370194 A1 | 12/2016 | Colijn et al. |
| 2017/0123428 A1 | 5/2017 | Levinson et al. |
| 2017/0262790 A1* | 9/2017 | Khasis ................. G08G 1/012 |
| 2018/0136644 A1 | 5/2018 | Levinson et al. |
| 2020/0050198 A1* | 2/2020 | Donnelly ............... G06Q 50/30 |

OTHER PUBLICATIONS

Arentze, Theo A. et al., "ALBATROSS—A Learning-Based Transportation Oriented Simulation System", Transportation Research Part B Methodological, Aug. 2004, vol. 38, Issue: 7, pp. 613-633, Elsevier, http://citeseerx.ist.psu.edu/viewdoc/download?doi=10.1.1.474.9610&rep=rep1&type=pdf.

Chen, Chang-Yi et al., "Using Data Mining Techniques on Fleet Management System", ESRI International User Conference, Jan. 2008, Research Gate, https://citeseerx.ist.psu.edu/viewdoc/download?doi=10.1.1.111.7865&rep=rep1&type=pdf.

Abourezq, Manar, et al., "Database-as-a-service for big data: An overview", International Journal of Advanced Computer Science and Applications, Jan. 2016, Research Gate, https://www.researchgate.net/publication/292947641_Database-as-a-Service_for_Big_Data_An_Overview/link/56b5ba0308ae44bb3306266b/download.

International Search Report Mailed Oct. 15, 2020, in International Application No. PCT/IN2019/050964; 3 pages.

Written Opinion mailed Sep. 11, 2020, in International Application No. PCT/IN2019/050964; 8 pages.

* cited by examiner

SELF-LEARNING BASED MECHANISM FOR VEHICLE UTILIZATION AND OPTIMIZATION

CROSS-REFERENCE TO RELATED PATENT APPLICATIONS

This is a U.S. National Stage under 35 U.S.C. § 371 and claims priority to International Application No. PCT/IB2019/050964, filed Dec. 30, 2019, which claims priority under 35 U.S.C. § 119 to Indian patent application No. 201821049921, filed on Dec. 31, 2018, and the contents of all the referenced applications are hereby incorporated by reference.

TECHNICAL FIELD

The disclosure herein generally relates to field of vehicle utilization and optimization, more particularly, to self-learning based mechanism for vehicle utilization and optimization.

BACKGROUND

Automating and optimizing transportation management has become essential for entities including enterprises or organizations in today's more fluid, global and Omni-channel world. Organizations strive to provide cost effective, comfortable, safe and secure transportation system for all the persons travelling to and from office, schools and other entities. Private fleets by organizations pose challenges due to their inability to cater to huge volume of travel requests at peak hours, including travel locations.

Conventional systems do not provide fully automated solution(s) for vehicle utilization and optimization and require manual checks by transport administrators using local knowledge leading to delay affecting process efficiency. Further, conventional systems incorporate ride-sharing algorithms which focus on traveler preferences and traveler profile and are applicable on a system where the focus is mainly on finding a single closest match for pooling. Furthermore, conventional systems such as linear programming problem and geo code based route planning provide map based routing and allocation which do not take into account practical conditions and location specific regulations. Moreover, the above conventional methods are unable to provide accuracy and optimization when dynamic planning scenario arises.

SUMMARY

Embodiments of the present disclosure present technological improvements as solutions to one or more of the above-mentioned technical problems recognized by the inventors in conventional systems. For example, in one aspect, there is provided a processor implemented method, comprising: receiving, from a plurality of users, a plurality of incoming travel requests, each incoming travel request from the plurality of incoming travel requests corresponds to a user from the plurality of users; querying a system database, based on the plurality of incoming request, to determine at least one of (i) whether one or more incoming requests are new requests, and (ii) inconsistencies in information comprised in the system database and to obtain a list comprising information corresponding to one or more vehicles. In an embodiment, each vehicle from the identified one or more vehicles comprises one of (i) occupancy capacity identical to other vehicles, (ii) occupancy capacity greater than other vehicles or (iii) occupancy capacity lesser than other vehicles. In an embodiment, the method further comprising identifying a plurality of locations being accessible by the identified one or more vehicles; identifying (i) a first location from the plurality of locations and (ii) a first set of users from the plurality of users based on the first location; identifying, (i) one or more locations from the plurality of locations and (ii) a second set of users from the plurality of users, such that the one or more locations being identified are based on frequency of the one or more locations that were previously combined with the first location to obtain an optimal set of locations; allocating each user from the first set and second set of user to the identified one or more vehicles based on at least one of (i) one or more social constraints, and (ii) one or more constraints associated with the identified one or more vehicles; and generating, a trip schedule for the identified one or more vehicles, based on the allocation of the first set of users and the second set of users with a corresponding vehicle from the identified one or more vehicles.

In an embodiment, the one or more social constraints comprise at least one of (i) at least one user being identified as a female user having at least one of (a) last drop, and (b) a first pick up; (ii) at least one user being identified as a male user from the first set of users or the second set of user for accompanying with the female user having the last drop; at least one user being identified as a male user from the first set of users or the second set of user for accompanying with the female user having the last drop; (iii) at least one security personnel being identified in addition to number of users for an identified vehicle, wherein the at least one security personnel is identified when the male user is not available. In an embodiment, the one or more constraints associated with the identified one or more vehicles comprise at least one of (i) restrictive access to one or more locations based on size of the identified one or more vehicles; (ii) pick up and drop timing based selection of one or more vehicles, from and to the one or more locations. In an embodiment, the method further comprising determining, based on number of users occupied, one or more underutilized vehicles from the identified one or more vehicles; identifying, by querying the system database, at least one of (i) one or more users that can be accommodated into the one or more underutilized vehicles, and (ii) one or more available occupancy capacity vehicles having occupancy less than the identified one or more vehicles; based on information queried from the system database, performing at least one of (i) applying a vehicle downgrade logic on the one or more underutilized vehicles, wherein the vehicle downgrade logic recommends to change existing underutilized vehicle with next best available lower occupancy capacity vehicle; (ii) allocating the one or more users that were previously accommodated in the one or more underutilized vehicles into the next best available lower occupancy capacity vehicle. In an embodiment, the method further comprising dynamically updating the system database by learning (i) the information pertaining to one or more new requests, (ii) inconsistencies in information comprised in the system database, and (iii) information associated with one or more underutilized vehicles.

In another aspect, there is provided a system comprising: a memory storing instructions; one or more communication interfaces; and one or more hardware processors coupled to the memory through the one or more communication interfaces, wherein the one or more hardware processors are configured by the instructions to receive, from a plurality of users, a plurality of incoming travel requests, each incoming travel request from the plurality of incoming travel requests corresponds to a user from the plurality of users; query a system database, based on the plurality of incoming request, to determine at least one of (i) whether one or more incoming requests are new requests, and (ii) inconsistencies in information comprised in the system database and to obtain a list comprising information corresponding to one or more vehicles. In an embodiment, each vehicle from the identified one or more vehicles comprises one of (i) occupancy capacity identical to other vehicles, (ii) occupancy capacity greater than other vehicles or (iii) occupancy capacity lesser than other vehicles. In an embodiment, the one or more hardware processors are further configured to identify a plurality of locations being accessible by the identified one or more vehicles; identify (i) a first location from the plurality of locations and (ii) a first set of users from the plurality of users based on the first location; identify, (i) one or more locations from the plurality of locations and (ii) a second set of users from the plurality of users, such that the one or more locations being identified are based on frequency of the one or more locations that were previously combined with the first location to obtain an optimal set of locations; allocate each user from the first set and second set of user to the identified one or more vehicles based on at least one of (i) one or more social constraints, and (ii) one or more constraints associated with the identified one or more vehicles; and generate, a trip schedule for the identified one or more vehicles, based on the allocation of the first set of users and the second set of users into a corresponding vehicle from the identified one or more vehicles.

In an embodiment, the one or more social constraints comprise at least one of (i) at least one user being identified as a female user having at least one of (a) last drop, and (b) a first pick up; (ii) at least one user being identified as a male user from the first set of users or the second set of user for accompanying with the female user having the last drop; at least one user being identified as a male user from the first set of users or the second set of user for accompanying with the female user having the last drop; (iii) at least one security personnel being identified in addition to number of users for an identified vehicle, wherein the at least one security personnel is identified when the male user is not available. In an embodiment, the one or more constraints associated with the identified one or more vehicles comprise at least one of (i) restrictive access to one or more locations based on size of the identified one or more vehicles; (ii) pick up and drop timing based selection of one or more vehicles, from and to the one or more locations. In an embodiment, the one or more hardware processors are further configured to determine, based on number of users occupied, one or more underutilized vehicles from the identified one or more vehicles; identify, by querying the system database, at least one of (i) one or more users that can be accommodated into the one or more underutilized vehicles, and (ii) one or more available occupancy capacity vehicles having occupancy less than the identified one or more vehicles; based on information queried from the system database, perform at least one of (i) apply a vehicle downgrade logic on the one or more underutilized vehicles, wherein the vehicle downgrade logic recommends to change existing underutilized vehicle with next best available lower occupancy capacity vehicle; (ii) allocate the one or more users that were previously accommodated in the one or more underutilized vehicles into the next best available lower occupancy capacity vehicle. In an embodiment, the one or more hardware processors are further configured to dynamically update the system database by learning (i) the information pertaining to one or more new requests, (ii) inconsistencies in information comprised in the system database, and (iii) information associated with one or more underutilized vehicles.

In yet another aspect, there are provided one or more non-transitory machine readable information storage mediums comprising one or more instructions which when executed by one or more hardware processors cause receiving, from a plurality of users, a plurality of incoming travel requests, each incoming travel request from the plurality of incoming travel requests corresponds to a user from the plurality of users; querying a system database, based on the plurality of incoming request, to determine at least one of (i) whether one or more incoming requests are new requests, and (ii) inconsistencies in information comprised in the system database and to obtain a list comprising information corresponding to one or more vehicles. In an embodiment, each vehicle from the identified one or more vehicles comprises one of (i) occupancy capacity identical to other vehicles, (ii) occupancy capacity greater than other vehicles or (iii) occupancy capacity lesser than other vehicles. In an embodiment, the instructions may further cause identifying a plurality of locations being accessible by the identified one or more vehicles; identifying (i) a first location from the plurality of locations and (ii) a first set of users from the plurality of users based on the first location; identifying, (i) one or more locations from the plurality of locations and (ii) a second set of users from the plurality of users, such that the one or more locations being identified are based on frequency of the one or more locations that were previously combined with the first location to obtain an optimal set of locations; allocating each user from the first set and second set of user to the identified one or more vehicles based on at least one of (i) one or more social constraints, and (ii) one or more constraints associated with the identified one or more vehicles; and generating, a trip schedule for the identified one or more vehicles, based on the allocation of the first set of users and the second set of users into a corresponding vehicle from the identified one or more vehicles.

In an embodiment, the one or more social constraints comprise at least one of (i) at least one user being identified as a female user having at least one of (a) last drop, and (b) a first pick up; (ii) at least one user being identified as a male user from the first set of users or the second set of user for accompanying with the female user having the last drop; at least one user being identified as a male user from the first set of users or the second set of user for accompanying with the female user having the last drop; (iii) at least one security personnel being identified in addition to number of users for an identified vehicle, wherein the at least one security personnel is identified when the male user is not available. In an embodiment, the one or more constraints associated with the identified one or more vehicles comprise at least one of (i) restrictive access to one or more locations based on size of the identified one or more vehicles; (ii) pick up and drop timing based selection of one or more vehicles, from and to the one or more locations. In an embodiment, the instructions may further cause determining, based on number of users occupied, one or more underutilized vehicles from the identified one or more vehicles; identifying, by querying the system database, at least one of (i) one or more users that can be accommodated into the one or more underutilized vehicles, and (ii) one or more available occupancy capacity vehicles having occupancy less than the identified one or more vehicles; based on information queried from the system database, performing at least one of (i)

applying a vehicle downgrade logic on the one or more underutilized vehicles, wherein the vehicle downgrade logic recommends to change existing underutilized vehicle with next best available lower occupancy capacity vehicle; (ii) allocating the one or more users that were previously accommodated in the one or more underutilized vehicles into the next best available lower occupancy capacity vehicle. In an embodiment, the instructions may further cause dynamically updating the system database by learning (i) the information pertaining to one or more new requests, (ii) inconsistencies in information comprised in the system database, and (iii) information associated with one or more underutilized vehicles.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide systems and methods that implement a self-learning based mechanism for vehicle utilization and optimization, wherein a custom machine learning based model is utilized for dynamic assignment of users to vehicles. For dynamic assignment of the users to vehicles, the custom machine learning based model learns the details available in a system database as past history for learning previously executed trips. The system database comprises of information such as user details, shift timing, vehicle types, vehicle capacity, reckoner distance of location of each user (e.g., associate, employee, student, visitor and the like) with respect to facility (interchangeably referred as office), and number of users along with the localities that were previously clubbed together. A self-learning algorithm generates locality pairings and clubbing patterns once training is initiated on the data available from the system database for a particular facility (interchangeably referred as office). Also, the self-learning algorithm learns the vehicle types used for a given shift for each of the facilities (interchangeably referred as offices). These learnings are stored in a separate database and are used to analyze the roster in real time for any given shift for a given facility and apply additional rules like social constraint and generate optimum trip sheet with correct clubbing of localities. Further, learning the previously executed trips helps in analyzing how different localities were clubbed together in the past, identifying a particular time when vehicle is not allowed to go in a certain locality. Further, the model is trained with the information provided by the separate database such as vehicle constraints, social constraints, wherein social constraints may include safety of female users. Based on the learnt patterns, a cab allocation algorithm utilizes an associative classification mechanism to find and extract associations from the list of previously executed trips and constraints. The cab allocation algorithm eliminates exceptions from previously executed trips. Based on the extracted associations, the cab allocation algorithm includes grouping a set of users in a set of vehicles in such a way that the optimally assigning a vehicles with right set of users based on previous patterns of assigning the vehicle with users. This grouping helps in identifying the exceptions from the previously executed trips based on value of one or more parameters such as association frequency of locations and corresponding users, wherein association frequency depicts the frequency of the locations that were previously combined. The optimal assignment of vehicles helps in reducing the number of the vehicles by maximizing the vehicle occupancy and ensures reducing the user discomfort, travel timing and distance. The proposed disclosure prevents adverse effect on travel time of users (e.g., associates, employees, students, visitors and the like) and provides reasonable routes to be taken for pick-up and drops.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

Figure 1:
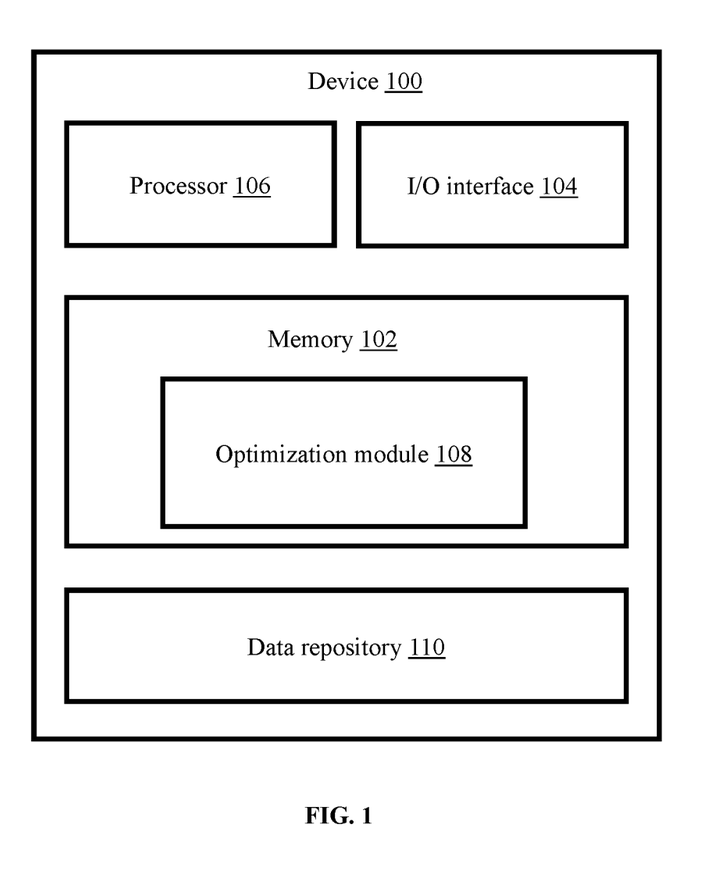
FIG. 1 illustrates a functional block diagram of a system for vehicle utilization and optimization based on a self-learning based mechanism, according to some embodiments of the present disclosure.

FIG. 1 illustrates a functional block diagram of a system for vehicle utilization and optimization based on a self-learning based mechanism, according to some embodiments of the present disclosure. The system 100 includes or is otherwise in communication with one or more hardware processors such as a processor 106, an I/O interface 104, at least one memory such as a memory 102, and an optimization module 108. In an embodiment, the optimization module 108 can be implemented as a standalone unit in the system 100. In another embodiment, the optimization module 108 can be implemented as a module in the memory 102. The processor 106, the I/O interface 104, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The hardware processor 106 may be implemented as one or more microprocessors, microcomputers, microcontrollers, digital signal processors, central processing units, state machines, logic circuitries, and/or any devices that manipulate signals based on operational instructions. Among other capabilities, the hardware processor 106 is configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes the plurality of modules 108 and a repository 110 for storing data processed, received, and generated by one or more of the modules 108. All the information and computation performed or processed by the modules 108 are stored in the memory of the system and are invoked as applicable and required. The modules 108 may include routines, programs, objects, components, data structures, and so on, which perform particular tasks or implement particular abstract data types.

The data repository 110, amongst other things, includes a system database and other data. The other data may include data generated as a result of the execution of one or more modules in the modules 108. The system database stores the previously executed trip sheets, patterns of previously clubbed localities, inconsistencies occurring in the system, and other data generated as a result of the execution of one or more modules in the modules 108. The data stored in system database can be learnt for dynamically updating the system database.

In an embodiment, the optimization module 108 can be configured to optimize and utilize vehicle based on a self-learning based mechanism. Self-learning based mechanism for vehicle utilization and optimization can be carried out by using methodology, described in conjunction with FIG. 2, FIG. 3 and using examples.

Figure 2:
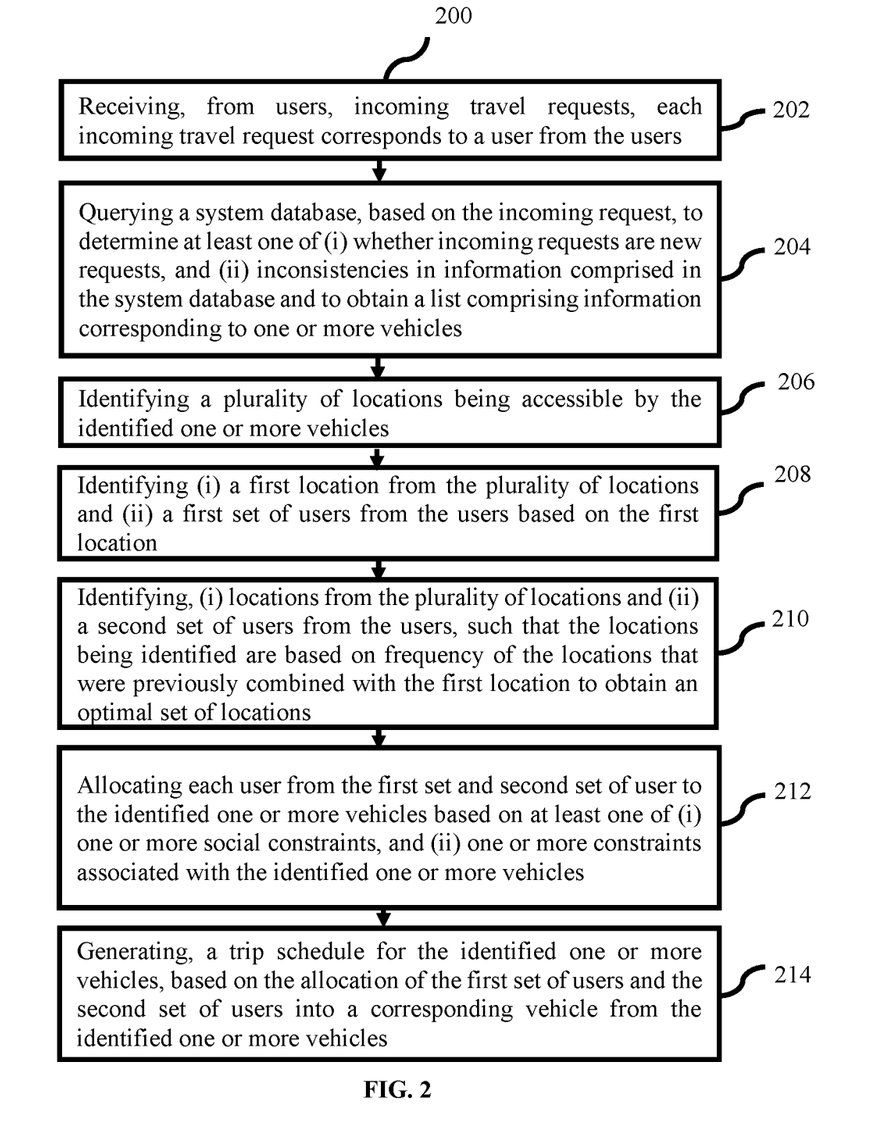
FIG. 2 is an exemplary flow diagram of a processor implemented method for vehicle utilization and optimization based on a self-learning based mechanism, in accordance with some embodiments of the present disclosure.

FIG. 2, with reference to FIG. 1, is an exemplary flow diagram of a processor implemented method for vehicle utilization and optimization based on a self-learning based mechanism using the optimization module 108 of FIG. 1, in accordance with some embodiments of the present disclosure. In an embodiment of the present disclosure, at step 202 of FIG. 2, the one or more hardware processors 106 receive a plurality of incoming travel requests from a plurality of users, each incoming travel request from the plurality of incoming travel requests corresponds to a specific user from the plurality of users. In an embodiment, the plurality of users may include but are not limited to person(s)/individual(s) associated with one or more entities, wherein the entities may include but not limited to a school, an organization, a company, and the like, and wherein the user (e.g., associate, employee, student, visitor, and the like) may be tagged to a particular facility of the organization or switching between different facilities of the organization. For example, a user A working for an organization X could be permanently tagged to facility 1 of organization X. There is a probability of user X to be not permanently tagged to any facility of organization X, so user X might be switching from one facility to another due to the nature of work. Further, there are chances that a user X is permanently tagged to facility 1 of the organization X, but due to work requirements, user X might have to sometimes work from a different facility of organization X. In an embodiment, the incoming travel requests are received from the users (e.g., associates, employees, students, visitors and the like) who require transportation for their corresponding location (interchangeably referred as destination) through a shift wise roster system. For example, during rostering, it is assumed that eight users raise a request for a drop through the shift wise rostering system to avail transportation from facility 1 one of organization X at a particular time (say 1:00 AM) on a particular date (say 1st September 2018) and are to be dropped at specific locations (localities) that they enter in the system. In an embodiment, the shift wise rostering system may include but not limited to an Enterprise Management System (ETMS) dashboard on an organization's portal. The incoming travel requests are saved in the shift wise rostering system as roster details for that particular shift (e.g., 1:00 am shift) for that particular date (e.g., 1 Sep. 2018). The roster has a mix of users (both male and females) travelling to different parts of a city. An example of format of the roster is depicted in Table 1 as:

TABLE 1

| User ID | Location/ Destination | Distance (Kms) | Date | Shift-Time | Gender |
| --- | --- | --- | --- | --- | --- |
| 1 | Location 1 | 10 | Jan. 9, 2018 | 1:00 AM | F |
| 2 | Location 2 | 6 | Jan. 9, 2018 | 1:00 AM | M |
| 3 | Location 3 | 4 | Jan. 9, 2018 | 1:00 AM | F |
| 4 | Location 1 | 10 | Jan. 9, 2018 | 1:00 AM | M |
| 5 | Location 4 | 2 | Jan. 9, 2018 | 1:00 AM | M |
| 6 | Location 2 | 6 | Jan. 9, 2018 | 1:00 AM | F |
| 7 | Location 3 | 4 | Jan. 9, 2018 | 1:00 AM | F |
| 8 | Location 4 | 2 | Jan. 9, 2018 | 1:00 AM | M |

Here, the distance specified in the Table 1 refers to distance between each locality and the facility. The distance specified in the Table 1 is stored in the system database as Reckoner Distance.

In an embodiment, a machine learning model is trained with data available in a system database. The system database comprises information such as information of each user, vehicle information, enterprise management unit information and the like. In an embodiment, the information of each user may include but not limited to personal details of users (e.g., name, date of birth, birth place and the like), shift timings, reckoner distance of location of each user with respect to facility, location (interchangeably referred as destination) of each user, gender of each user and the like. In an embodiment, the vehicle information may comprise but not limited to number of available vehicles, type of available vehicles, type of vehicles used for a given shift pertaining to one facility, vehicle capacity, and the like. In an embodiment, the enterprise management unit information may comprise but not limited to a list of users requesting for transportation, previous trip history, clubbing/or combining patterns of locations during previously executed trips, trip sheets generated, and the like. Executed trips from the past may be (or are) used to learn patterns and associations within the data. These interaction are stored in the form of associations between multiple localities within a city. An example of previously executed published trips from a particular facility of an organization (e.g., facility 1) for different days and shift-timings to different locations or destinations is provided in Table 2 and an association matrix providing associations within the data is provided in Table 3 as:

TABLE 2

| Trip ID | Facility | User ID | Date | Shift-Time | Type Of Vehicle | Location/Destination |
|---|---|---|---|---|---|---|
| A | Facility 1 | 3 | Jan. 1, 2018 | 1:00 AM | Vehicle 2 (4-seater) | Location 6 |
| A | Facility 1 | 7 | Jan. 1, 2018 | 1:00 AM | Vehicle 2 (4-seater) | Location 6 |
| A | Facility 1 | 5 | Jan. 1, 2018 | 1:00 AM | Vehicle 2 (4-seater) | Location 5 |
| A | Facility 1 | 8 | Jan. 1, 2018 | 1:00 AM | Vehicle 2 (4-seater) | Location 4 |
| B | Facility 1 | 1 | Jul. 10, 2018 | 1:00 AM | Vehicle 1 (6-seater) | Location 1 |
| B | Facility 1 | 4 | Jul. 10, 2018 | 1:00 AM | Vehicle 1 (6-seater) | Location 1 |
| B | Facility 1 | 2 | Jul. 10, 2018 | 1:00 AM | Vehicle 1 (6-seater) | Location 3 |
| B | Facility 1 | 6 | Jul. 10, 2018 | 1:00 AM | Vehicle 1 (6-seater) | Location 3 |
| C | Facility 1 | 10 | Apr. 29, 2018 | 1:00 AM | Vehicle 2 (4-seater) | Location 1 |
| C | Facility 1 | 11 | Apr. 29, 2018 | 1:00 AM | Vehicle 2 (4-seater) | Location 2 |
| C | Facility 1 | 9 | Apr. 29, 2018 | 1:00 AM | Vehicle 2 (4-seater) | Location 3 |

TABLE 3

|  | Location 1 | Location 2 | Location 3 | Location 4 | Location 5 | Location 6 |
|---|---|---|---|---|---|---|
| Location 1 | — | 1 | 2 | 0 | 0 | 0 |
| Location 2 | 1 | — | 1 | 0 | 0 | 0 |
| Location 3 | 2 | 1 | — | 0 | 0 | 0 |
| Location 4 | 0 | 0 | 0 | — | 1 | 1 |
| Location 5 | 0 | 0 | 0 | 1 | — | 1 |
| Location 6 | 0 | 0 | 0 | 1 | 1 | — |

Referring back to FIG. 2, at step 204, the one or more hardware processors 106 are configured to query the system database, based on the plurality of incoming request, to determine whether one or more incoming requests are new requests. In an embodiment, the system database comprises information pertaining to a particular facility of an organization. In an embodiment, an incoming travel request, received from a new user for a new location (interchangeably referred as destination), wherein information of new user and new location is not present in system, is considered to be a new request. For instance, a request for locality 3 is requested by a user C, wherein information associated with both locality 3 and user C is not present in the system, then the request for locality 3 by user C is identified as new request. Here, the determined new request is considered as inconsistency (alternatively referred as exception).

In an embodiment, the system database is also queried to determine inconsistencies in information comprised in the system database. In an embodiment, the inconsistencies may include an incoming travel request received from a user from the plurality of users, wherein information related to user is already stored in the system database but requested location (interchangeably referred as destination) by the user changes from the usual location (interchangeably referred as destination) of user. The system database is queried to determine whether newly requested location (interchangeably referred as destination) by user is present in the system database. Upon finding that the incoming travel request for a location (interchangeably referred as destination) by existing user is not present in the system database, the incoming travel request is identified as inconsistency. For instance, user A usually request for locality 1, but in some circumstances user A requests for locality 2 which is not his normally requested location (interchangeably referred as destination), then the request for locality 2 by an existing user A is identified as inconsistency (alternatively referred as an exception). In another embodiment, an incoming request received from a new user for a location (interchangeably referred as destination) existing in the system database is considered as an inconsistency if the information associated with new user is not present in the system database. For instance, a request for locality 1 is requested by user B, wherein locality 1 is already present in the system database but no information associated with user B is present in the system, then the request for an existing locality 1 by new user B is identified as inconsistency (alternatively referred as an exception). Further, inconsistencies may include a trip from a stray instance due to some unavoidable on-ground reasons which clubs two localities that may not be the best match, last minute cancellation requests, missed out locations (interchangeably referred as destinations), and the like. In an embodiment, the system database is queried to obtain a list comprising information corresponding to one or more vehicles. Upon receiving travel requests from a plurality of users, the system database is queried to determine number of available vehicles by checking ground fleet. Further, from the available vehicles, one or more vehicles with highest capacity are identified. For instance, it is assumed that the available vehicle fleet comprises but not limited to a 6-seater vehicle (interchangeably referred as vehicle 1), two 4-seater vehicle (interchangeably referred as vehicle 2), and the like.

In this case, the identified highest capacity vehicle is vehicle 1 which is 6-seater, so vehicle 1 should be filled first with the users. So, here the system picks vehicle 1 (6-seater) as the first vehicle to which it allocates users. Selection of the highest capacity vehicle first, ensures maximum allocation in minimum number of vehicles. In an embodiment, each vehicle from the identified one or more vehicles may have (i) occupancy capacity identical to other vehicles, (ii) occupancy capacity greater than other vehicles or (iii) occupancy capacity lesser than other vehicles. For instance, if the identified one or more vehicle comprises, a 7-seater (interchangeably referred as vehicle 3), vehicle 1, vehicle 2, another 4-seater (interchangeably referred as vehicle 4), then vehicle 2 and vehicle 4 are the vehicles having identical occupancy capacity (e.g., 4-seater). However, vehicle 2 has occupancy capacity (e.g., 4-seater) lesser than vehicle 1 (e.g., 6-seater) and vehicle 3 has occupancy capacity (e.g., 7-seater) greater than vehicle 2 (e.g., 6-seater).

Referring back to FIG. 2, as depicted in step 206, a plurality of locations being accessible by the identified one or more vehicles with highest capacity are identified, wherein the identified locations are arranged in descending order of distance. In other words, all locations from the trained vector where the one or more vehicles with highest capacities vehicle goes are determined. Table 3 also provides an allocation plan of users to identified vehicles.

As can be seen from Table 3, if vehicle 1 (6-seater) is identified as the highest capacity vehicle, the system uses the trained vector to identify the locations (In this case location 1 and location 3 as can be seen from Table 2) from the given roster which are accessible by vehicle 1 (6-seater) at a particular time (say 1:00 AM at night). The training vector also shows that all above mentioned localities (e.g., location 1 and location 3) are accessible by both vehicle 2 (4-seater) and vehicle 1 (6-seater) at the same time (e.g., 1:00 AM at night).

Further, as depicted in step 208 of FIG. 2, a first location from the plurality of locations and (ii) a first set of users from the plurality of users based on the first location are identified. The first location identified from the plurality corresponds to farthest location and is determined based on distance from the selected facility of an organization, For example, as depicted in Table 1, Location 1 is the farthest location with a distance of 10 Km from facility 1 of an organization. Further, a first set of user from the plurality of users that are going to the first and the farthest locations are identified. As can be seen from Table 1, users with user ID1 and user ID4 are identified as first set of users going to the identified first and farthest location (e.g., in this case, location 1) which are accessible by vehicle 1 (6-seater). The occupancy of vehicle 1 (6-seater) at this point is two.

Further, as depicted in step 210 of FIG. 2, (i) one or more locations from the plurality of locations and (ii) a second set of users from the plurality of users, such that the one or more locations being identified are based on frequency of the one or more locations that were previously combined with the first location to obtain an optimal set of locations. The frequency of the one or more locations that were previously combined with the first location to obtain an optimal set of locations is computed to find associations between previous clubbed locations along with the users going to those locations. In an embodiment, the location pairs that have been clubbed more than two times in the past are only selected. It is observed that a stray instance may get captured during any day of the week for a given shift-time and that instance may get duplicated over the next day. The probability that the instance may occur two times in a week is high. Hence location pairs that are clubbed more than two times only are considered to get an optimized allocation plan. The association between previous clubbed locations is shown in Table 3. In an embodiment, the second set of users are different from the first of users. The system checks the association of other locations present in the identified list with the identified first and farthest location (In this case, location 1) accessible by vehicle 1 (6-seater). For instance, the pre-trained association matrix as shown in the Table 3 shows that location 3 is the only location that has previously been clubbed with location 1, so it allocates user with user ID 2 and user ID 6 also to the same vehicle 1 (6-seater). Occupancy in vehicle 1 (6-seater) after this allocation is 4 out of 6. The system now checks for other locations in the identified list from the roster which can be accommodated in the same vehicle with users going to location 1 and location 3. But, as can be seen from Table 3, none of the other localities present in the roster have previously been clubbed with both location 1 and location 3, the system does not add any more users to this vehicle. Until users going to a particular location are found in the roster, the system keeps on adding the users in each vehicle from the identified one or more vehicles if the vehicles are not full. If no user going to the particular location are found in the roster, then the system picks the next best location where the each vehicle goes. If there are users going to some location other than the locations present in the system database, the system would check whether this new user's location has been clubbed with all the location previously clubbed in the past. If the new location has been clubbed with all the locations previously individually, then only the user would be allowed to be added in any of the identified one or more vehicles. Otherwise, the system skips the corresponding user and provide provisions for catering the user later in other vehicle. This step is performed to reduce and eliminate exceptional condition and inconsistences getting created.

Referring back to FIG. 2, at step 212, each user from the first set and second set of user are allocated to the identified one or more vehicles based on at least one of (i) one or more social constraints, and (ii) one or more constraints associated with the identified one or more vehicles. In an embodiment, the social and vehicles constraints are applied during allocation of users to the identified one or more vehicles. In an embodiment, the one or more social constraints relate to female user's security. In an embodiment, the one or more social constraints comprises identifying if at least one user allocated to each of the identified one or more vehicles is a female, and if the identified female user is having either last drop or a first pick up. If at least one user is identified as female user having either last drop of first, then it is identified if at least one male user from the first set of users or the second set of user would accompany the female user having the last drop if the value of detour distance for the male user is within a permissible limit, wherein the permissible limit imposed on the value of detour distance is configurable and may vary based on location. In other words, the permissible limit imposed on the value of detour distance could be different for different cities, different countries and the like. In an embodiment, the permissible limit imposed on the value of detour distance could be but not limited to 3 Km, 5 Km, 210 Km and the like. If female user cannot be accompanied by a male user, then the system checks if at least one security personnel is being identified in addition to number of users for an identified vehicle for safely dropping the female user to her corresponding location (interchangeably referred as destination).

In an embodiment, the one or more constraints associated with the identified one or more vehicles (also referred as vehicle constraints) may include restrictive access to one or more locations based on size of the identified one or more vehicles. There are some big sized vehicles which are not allowed to enter in one or more locations due to narrow size of streets or congestion in the one or more location. Further, the vehicle constraints may include pick up and drop timing based selection of one or more vehicles, from and to the one or more locations. For instance, there could be few vehicles which are not allowed to enter in specific location(s) in night/specific hour(s).

In an embodiment, after allocating each user from the first set and second set of user to the identified one or more vehicles, the system determines, based on number of users occupied, if any vehicle from the identified one or more vehicles is underutilized. In an embodiment, the user occupancy is determined based on associations between user locations accessible by the vehicle. For instance, if in a vehicle 1 (6-seater), only two locations are previously clubbed more than two times, in that case, user going to these two locations only would be allowed in vehicle 1 (6-seater), and others are discarded. If number of users going to these two previously clubbed locations is four, then, even though vehicle 1 has a user occupancy capacity of 6 users, yet it is underutilized since only four users are accommodated into it. In other words, it is determined if the identified one or more vehicles are not full and there are no more users that can be accommodated in the same vehicles. If an underutilized vehicle is determined, then the system queries the system database, to identify if there are one or more users that can be accommodated into the underutilized vehicle or if there are one or more lower occupancy capacity vehicles available. Based on the information queried from the system database, the system allocates the one or more users that were previously accommodated in underutilized vehicle into next best available lower occupancy capacity vehicle. Otherwise, the system applies a vehicle downgrade logic on the underutilized vehicle if there are no users that can be accommodated to the underutilized vehicles, wherein the vehicle downgrade logic recommends to change existing underutilized vehicle with next best available lower occupancy capacity vehicle. For instance, if a vehicle 1 (6-seater) is accommodating only 4 users and thus underutilized. Then in such cases, the system should query the system database for two users that can be accommodated same vehicle 1 (6-seater). In an embodiment, the two users identified by querying the system database might be newly added users who were not previously present in the system database. In cases of no user identified by querying the system database, the system may identify if a vehicle with an occupancy capacity of four users (e.g., vehicle 2 (4-seater), and the like) is available and allocate the users previously allocated to vehicle 1 (6-seater) into the available vehicle with an occupancy capacity of four users (e.g., vehicle 2 (4-seater), and the like).

Further, as depicted at step 214 of FIG. 2, after all the rostered users are allocated to the identified one or more vehicles, a trip schedule for the identified one or more vehicles with detailed allocation plan is generated, based on the allocation of the first set of users and the second set of users into a corresponding vehicle from the identified one or more vehicles. Further, the system database is dynamically updated by learning (i) the information pertaining to one or more new requests, (ii) inconsistencies in information comprised in the system database, and (iii) information associated with one or more underutilized vehicles. In an embodiment, new trip schedule generated through the system are also used in future for re-training the machine learning model when required. In an embodiment, the information associated with one or more underutilized vehicles and how the one or more underutilized vehicle were filled during corresponding trips are also learnt and updated in the system database. Addition of new and missed locations are highlighted for intervention and approval of administrator and added to a default vehicle type. Allocation of new and missed locations are done based on the possible location pairing, the administrator may pair the new locality with an existing allocation. Upon confirmation by administrator, these allocations are saved for future learning and assignment and updated in the system database.

The illustrated steps of method 200 is set out to explain the exemplary embodiments shown, and it should be anticipated that ongoing technological development may change the manner in which particular functions are performed. These examples are presented herein for purposes of illustration, and not limitation.

Experimental Results:

The performance of the proposed system and traditional systems is analyzed in terms of simulation results. Simulations results shown in Table 4 and Table 5 provide a comparison of conventional systems with proposed system in terms of cost saving and effective vehicle utilization to reduce number of vehicles utilized for transportation resulting in vehicle savings.

TABLE 4

Results

| Facility | Sum of Cost (in Rs.) | | | No. of Users | | | No. of Trips | | | Total Sum of Cost (in Rs.) | Total No. of Users | No. of Trips |
|---|---|---|---|---|---|---|---|---|---|---|---|---|
| | 4-seater | 6-seater | 17-seater | 4-seater | 6-seater | 17-seater | 4-seater | 6-seater | 17-seater | | | |
| Trips Executed with Conventional System | | | | | | | | | | | | |
| Facility 1 | 859495 | 2944044.3 | 1294588.13 | 36490 | 29236 | 19703 | 1722 | 9363 | 3453 | 5098127.425 | 85429 | 15538 |
| Facility 2 | 468845.9 | 38421 | | 6150 | 677 | | 1938 | 147 | | 507266.9 | 6827 | 2085 |
| Facility 3 | 1119927 | 150828.75 | | 10268 | 1572 | | 4556 | 582 | | 1270755.25 | 11840 | 5138 |
| Facility 4 | 10279.5 | 528.75 | | 1120 | 16 | | 575 | 4 | | 120808.25 | 1136 | 579 |
| Sum | | | | | | | | | | 6996957.825 | 105232 | 23340 |
| Trips Executed with Proposed System | | | | | | | | | | | | |
| Facility 1 | 1338345 | 1685230.65 | 1297413 | 56186 | 10104 | 19139 | 3368 | 5505 | 3123 | 4320989.05 | 85429 | 11996 |
| Facility 2 | 248302.5 | 240574.5 | | 2171 | 4656 | | 1063 | 838 | | 488876.95 | 6827 | 1901 |
| Facility 3 | 645955.4 | 398790 | | 5108 | 6732 | | 2530 | 1186 | | 1044745.35 | 11840 | 3716 |

TABLE 4-continued

| | Results | | | | | | | | | | |
|---|---|---|---|---|---|---|---|---|---|---|---|
| | Sum of Cost (in Rs.) | | | No. of Users | | | No. of Trips | | | Total Sum of Cost (in Rs.) | Total No. of Users | No. of Trips |
| Facility | 4-seater | 6-seater | 17-seater | 4-seater | 6-seater | 17-seater | 4-seater | 6-seater | 17-seater | | | |
| Facility 4 | 152560.5 | 8302.5 | | 970 | 166 | | 527 | 34 | | 160863 | 1136 | 561 |
| Sum | | | | | | | | | | 6015474.35 | 105232 | 18174 |

TABLE 5

| Facility 4 | Facility 3 | Facility 2 | Facility 1 | Facility | |
|---|---|---|---|---|---|
| 120808.3 | 1270755 | 507266.9 | 5098127 | Trips Executed with traditional System | Total Sum of Cost |
| 160863 | 1044745.35 | 488876.95 | 4320989.05 | Trips Executed with Proposed System | |
| −33.16% | 17.79% | 3.63% | 15.24% | Savings | |
| 1136 | 11840 | 6827 | 85429 | Trips Executed with traditional System | Total No. of Users |
| 1136 | 11840 | 6827 | 85429 | Trips Executed with Proposed System | |
| 579 | 5138 | 2085 | 15538 | Trips Executed with traditional System | Total No. of Trips |
| 561 | 3716 | 1901 | 11996 | Trips Executed with Proposed System | |
| 3.11% | 27.68% | 8.82% | 22.80% | Vehicles Saved | |

Figure 3:
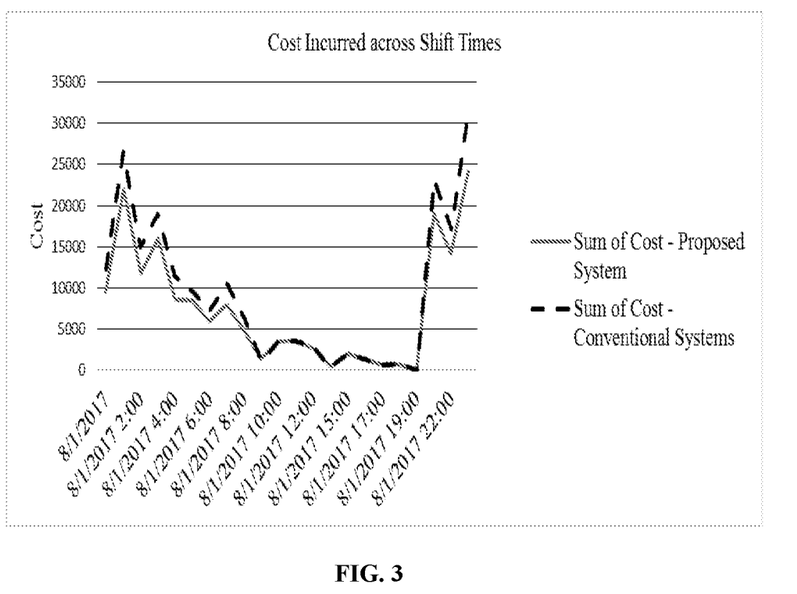
FIG. 3 depict graph illustrating comparison of cost incurred across all shifts for a particular enterprise facility in a particular day using conventional systems and proposed system, in accordance with some embodiments of the present disclosure.

As can be seen from Table 4 and Table 5, for all the four facilities with available vehicles including 4-seater vehicle, 7-seater vehicle and 17-seater vehicle, the total cost incurred using proposed system is less in comparison to the total cost incurred using conventional system. Further, using proposed system, less number of trips are executed for accommodating more number of users. However, using conventional system, more number of trips are executed for accommodating less number of users. As depicted in Table 5, the proposed system provides similar or lesser no. of vehicles for 92% of the shifts and total fleet size is reduced by 22%. Further, the proposed system provides improved cost saving (e.g., 15.24%, 3.63%, 17.79%, and −33.16%) and vehicles savings (e.g., 22.80%, 8.82%, 27.68%, and 3.11%) for all the four facilities in comparison to the conventional system. The proposed system provides an overall improvement of 14% in cost savings. FIG. 3 depicts a graph illustrating comparison of cost incurred across all shifts for a particular enterprise facility in a particular day using conventional system and proposed system, in accordance with some embodiments of the present disclosure. As depicted in FIG. 3, the cost incurred across all the shift for a particular day at a particular facility using proposed system is always less than the cost incurred using conventional system.

Hence the present disclosure provides a transportation system with self-learning capability to enable transport management in an optimized manner. The system adaptively learns (interchangeably referred as self-learn) the newly added data and any inconsistency identified. Further, the system learns the corresponding solution provided to handle identified inconsistencies. The proposed system provides vehicle utilization and optimization in one or more entities including enterprises or organizations by having complete control and visibility over their transport operations in real time. Further, the proposed system is time and memory efficient and provides higher accuracy in case of real time scenarios. Also, the proposed system is cost efficient and provides efficient vehicle utilization leading to vehicle savings.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being vehicle1ted by the following claims.

The invention claimed is:

1. A processor implemented method, comprising:
receiving (202), from a plurality of users, a plurality of incoming travel requests, each incoming travel request from the plurality of incoming travel requests corresponds to a user from the plurality of users;
querying a system database (204), based on the plurality of incoming travel requests, to determine at least one of (i) whether one or more incoming travel requests are new travel requests, and (ii) inconsistencies in information comprised in the system database and to identify one or more vehicles and obtain a list comprising information corresponding to the one or more vehicles, wherein the system database comprises information pertaining to a facility of an organization, wherein the system database comprises information of each of users, vehicles, and enterprise management unit, wherein the information of each user comprises personal details of users, shift timings, reckoner distance of location of each user with respect to the facility, location of each user, and gender of each user, wherein the vehicle information comprises a number of available vehicles, type of the available vehicles, type of vehicles used for a shift pertaining to one facility, and capacity of each of the available vehicles, and wherein the information of the enterprise management unit comprises a list of users requesting for transportation, a previous trip history, combining patterns of locations during previously executed trips, and trip sheets generated;
implementing a self-learning based mechanism for vehicle utilization of the one or more vehicles to dynamically assign the plurality of users to the one or more vehicles, wherein a custom machine learning based model is utilized for dynamic assignment of the plurality of users to the one or more vehicles;
learning by the custom machine learning model, details available in a system database as past history for learning one or more previously executed trips, the system database comprising information and the information including at least one user details, shift timing, vehicle types, vehicle capacity, reckoner distance of location of the plurality of users and a number of users from the plurality of users along with localities that were previously clubbed together;
generating by the self-learning based mechanism locality pairings and clubbing patterns once training is initiated on data available from the system database, wherein the self-learning based mechanism learns vehicle types used for a given shift for one or more facilities and learnings are stored in a separate database, the learnings being used to analyze rosters in real-time for at least one shift for the one or more facilities;
learning one or more previously executed trips to analyze clubbing of the localities and identifying a particular time when the vehicle is not allowed to go in a certain locality of the one or more localities, wherein the self-learning based mechanism is trained with information provided by the separate database, the information being at least one of vehicle constraints, and social constraints;
utilizing an associative classification mechanism based on the learnings to find and extract associations from the list of previously executed trips, the vehicle constraints and the social constraints and eliminating one or more exceptions from the list of previously executed trips;
dynamically updating the system database by learning (i) information pertaining to one or more new requests, (ii) the inconsistencies in information comprised in the system database, and (iii) information associated with one or more underutilized vehicles;
identifying (206) a plurality of locations being accessible by the identified one or more vehicles with highest capacity;
identifying (208), (i) a first location from the plurality of locations and (ii) a first set of users from the plurality of users based on the first location, wherein the first location corresponds to farthest location and is determined based on a distance from the facility of the organization;
identifying (210), (i) one or more locations from the plurality of locations and (ii) a second set of users from the plurality of users, such that the one or more locations being identified are based on frequency of the one or more locations that are previously combined with the first location to obtain an optimal set of locations, wherein the frequency of the one or more locations is used to find associations between previous clubbed locations along with the users going to the previous clubbed locations;

dynamically allocating (212) each user from the first set and second set of users to the identified one or more vehicles based on (i) one or more social constraints, and (ii) one or more constraints associated with the identified one or more vehicles, wherein the one or more social constraints comprises:
  (i) at least one user being identified as a female user having at least one of (a) last drop, and (b) a first pick up;
  (ii) at least one user being identified as a male user from the first set of users or the second set of users for accompanying with the female user having the last drop; and
  (iii) at least one security personnel being identified in addition to number of users for an identified vehicle, wherein the at least one security personnel is identified when the male user is not available, and
  wherein the one or more constraints associated with the identified one or more vehicles comprise:
    restrictive access to one or more locations based on size of the identified one or more vehicles; and
    pick up and drop timing-based selection of one or more vehicles, from and to the one or more locations; and
generating (214), a trip schedule for the identified one or more vehicles, based on the allocation of the first set of users and the second set of users into a corresponding vehicle from the identified one or more vehicles, thereby providing self-learning capability which ensures dynamic assignment of the first set of users and the second set of users to the identified one or more vehicles and vehicle utilization in real-time, wherein the trip schedule is generated by adaptively learning an association of the one or more locations with the identified first location and dynamically assigning the first set of users and the second set of users to the identified one or more vehicles based on the association.

2. The method of claim 1, wherein each vehicle from the identified one or more vehicles comprises one of (i) occupancy capacity identical to other vehicles, (ii) occupancy capacity greater than other vehicles or (iii) occupancy capacity lesser than other vehicles.

3. The method of claim 1, further comprising:
determining, based on number of users occupied, one or more underutilized vehicles from the identified one or more vehicles;
identifying, by querying the system database, at least one of (i) one or more users that can be accommodated into the one or more underutilized vehicles, and (ii) one or more available occupancy capacity vehicles having occupancy less than the identified one or more vehicles;
based on information queried from the system database, performing at least one of:
applying a vehicle downgrade logic on the one or more underutilized vehicles, wherein the vehicle downgrade logic recommends to change existing underutilized vehicle with next best available lower occupancy capacity vehicle;
allocating the one or more users that were previously accommodated in the one or more underutilized vehicles into the next best available lower occupancy capacity vehicle.

4. A system (100), comprising:
a memory (102);
one or more communication interfaces (104); and
one or more hardware processors (106) coupled to said memory through said one or more communication interfaces, wherein said one or more hardware processors are configured to:
  receive, from a plurality of users, a plurality of incoming travel requests, each incoming travel request from the plurality of incoming travel requests corresponds to a user from the plurality of users;
  query a system database, based on the plurality of incoming request, to determine at least one of (i) whether one or more incoming requests are new requests, and (ii) inconsistencies in information comprised in the system database and to identify one or more vehicles and obtain a list comprising information corresponding to the one or more vehicles, wherein the system database comprises information pertaining to a facility of an organization, wherein the system database comprises information of each of users, vehicles, and enterprise management unit, wherein the information of each user comprises personal details of users, shift timings, reckoner distance of location of each user with respect to the facility, location of each user, and gender of each user, wherein the vehicle information comprises a number of available vehicles, type of the available vehicles, type of vehicles used for a shift pertaining to one facility, and capacity of each of the available vehicles, and wherein the information of the enterprise management unit comprises a list of users requesting for transportation, a previous trip history, combining patterns of locations during previously executed trips, and trip sheets generated;
  implement a self-learning based mechanism for vehicle utilization of the one or more vehicles to dynamically assign the plurality of users to the one or more vehicles, wherein a custom machine learning based model is utilized for dynamic assignment of the plurality of users to the one or more vehicles;
  learn by the custom machine learning model, details available in a system database as past history for learning one or more previously executed trips, the system database comprising information and the information including at least one user details, shift timing, vehicle types, vehicle capacity, reckoner distance of location of the plurality of users and a number of users from the plurality of users along with localities that were previously clubbed together;
  generate by the self-learning based mechanism locality pairings and clubbing patterns once training is initiated on data available from the system database, wherein the self-learning based mechanism learns vehicle types used for a given shift for one or more facilities and learnings are stored in a separate database, the learnings being used to analyze rosters in real-time for at least one shift for the one or more facilities;
  learn one or more previously executed trips to analyze clubbing of the localities and identifying a particular time when the vehicle is not allowed to go in a certain locality of the one or more localities, wherein the self-learning based mechanism is trained with information provided by the separate database, the information being at least one of vehicle constraints, and social constraints;

utilize an associative classification mechanism based on the learnings to find and extract associations from the list of previously executed trips, the vehicle constraints and the social constraints and eliminating one or more exceptions from the list of previously executed trips;

dynamically update the system database by learning (i) information pertaining to one or more new requests, (ii) the inconsistencies in information comprised in the system database, and (iii) information associated with one or more underutilized vehicles;

identify a plurality of locations being accessible by the identified one or more vehicles with highest capacity;

identify, (i) a first location from the plurality of locations and (ii) a first set of users from the plurality of users based on the first location, wherein the first location corresponds to farthest location and is determined based on a distance from the facility of the organization;

identify, (i) one or more locations from the plurality of locations and (ii) a second set of users from the plurality of users, such that the one or more locations being identified are based on frequency of the one or more locations that are previously combined with the first location to obtain an optimal set of locations, wherein the frequency of the one or more locations is used to find associations between previous clubbed locations along with the users going to the previous clubbed locations;

dynamically allocate each user from the first set and second set of users to the identified one or more vehicles based on (i) one or more social constraints, and (ii) one or more constraints associated with the identified one or more vehicles, wherein the one or more social constraints comprises:
(i) at least one user being identified as a female user having at least one of (a) last drop, and (b) a first pick up;
(ii) at least one user being identified as a male user from the first set of users or the second set of users for accompanying with the female user having the last drop; and
(iii) at least one security personnel being identified in addition to number of users for an identified vehicle, wherein the at least one security personnel is identified when the male user is not available, and
wherein the one or more constraints associated with the identified one or more vehicles comprise:
restrictive access to one or more locations based on size of the identified one or more vehicles; and
pick up and drop timing-based selection of one or more vehicles, from and to the one or more locations; and generate, a trip schedule for the identified one or more vehicles, based on the allocation of the first set of users and the second set of users into a corresponding vehicle from the identified one or more vehicles, thereby providing self-learning capability which ensures dynamic assignment of the first set of users and the second set of users to the identified one or more vehicles and vehicle utilization in real-time, wherein the trip schedule is generated by adaptively learning an association of the one or more locations with the identified first location and dynamically assigning the first set of users and the second set of users to the identified one or more vehicles based on the association.

5. The system of claim 4, wherein each vehicle from the identified one or more vehicles comprises one of (i) occupancy capacity identical to other vehicles, (ii) occupancy capacity greater than other vehicles or (iii) occupancy capacity lesser than other vehicles.

6. The system of claim 4, further comprising:
determine, based on number of users occupied, one or more underutilized vehicles from the identified one or more vehicles;
identify, by querying the system database, at least one of (i) one or more users that can be accommodated into the one or more underutilized vehicles, and (ii) one or more available occupancy capacity vehicles having occupancy less than the identified one or more vehicles;
based on information queried from the system database, performing at least one of:
apply a vehicle downgrade logic on the one or more underutilized vehicles, wherein the vehicle downgrade logic recommends to change existing underutilized vehicle with next best available lower occupancy capacity vehicle;
allocate the one or more users that were previously accommodated in the one or more underutilized vehicles into the next best available lower occupancy capacity vehicle.

7. One or more non-transitory machine readable information storage mediums comprising one or more instructions which when executed by one or more hardware processors cause:
receiving, from a plurality of users, a plurality of incoming travel requests, each incoming travel request from the plurality of incoming travel requests corresponds to a user from the plurality of users;
querying a system database, based on the plurality of incoming request, to determine at least one of (i) whether one or more incoming requests are new requests, and (ii) inconsistencies in information comprised in the system database and to identify one or more vehicles and obtain a list comprising information corresponding to the one or more vehicles, wherein the system database comprises information pertaining to a facility of an organization, wherein the system database comprises information of each of users, vehicles, and enterprise management unit, wherein the information of each user comprises personal details of users, shift timings, reckoner distance of location of each user with respect to the facility, location of each user, and gender of each user, wherein the vehicle information comprises a number of available vehicles, type of the available vehicles, type of vehicles used for a shift pertaining to one facility, and capacity of each of the available vehicles, and wherein the information of the enterprise management unit comprises a list of users requesting for transportation, a previous trip history, combining patterns of locations during previously executed trips, and trip sheets generated;
implementing a self-learning based mechanism for vehicle utilization of the one or more vehicles to dynamically assign the plurality of users to the one or more vehicles, wherein a custom machine learning based model is utilized for dynamic assignment of the plurality of users to the one or more vehicles;

learning by the custom machine learning model, details available in a system database as past history for learning one or more previously executed trips, the system database comprising information and the information including at least one user details, shift timing, vehicle types, vehicle capacity, reckoner distance of location of the plurality of users and a number of users from the plurality of users along with localities that were previously clubbed together;

generating by the self-learning based mechanism locality pairings and clubbing patterns once training is initiated on data available from the system database, wherein the self-learning based mechanism learns vehicle types used for a given shift for one or more facilities and learnings are stored in a separate database, the learnings being used to analyze rosters in real-time for at least one shift for the one or more facilities;

learning one or more previously executed trips to analyze clubbing of the localities and identifying a particular time when the vehicle is not allowed to go in a certain locality of the one or more localities, wherein the self-learning based mechanism is trained with information provided by the separate database, the information being at least one of vehicle constraints, and social constraints;

utilizing an associative classification mechanism based on the learnings to find and extract associations from the list of previously executed trips, the vehicle constraints and the social constraints and eliminating one or more exceptions from the list of previously executed trips;

dynamically updating the system database by learning (i) information pertaining to one or more new requests, (ii) the inconsistencies in information comprised in the system database, and (iii) information associated with one or more underutilized vehicles;

identifying a plurality of locations being accessible by the identified one or more vehicles with highest capacity;

identifying, (i) a first location from the plurality of locations and (ii) a first set of users from the plurality of users based on the first location, wherein the first location corresponds to farthest location and is determined based on a distance from the facility of the organization;

identifying, (i) one or more locations from the plurality of locations and (ii) a second set of users from the plurality of users, such that the one or more locations being identified are based on frequency of the one or more locations that are previously combined with the first location to obtain an optimal set of locations, wherein the frequency of the one or more locations is used to find associations between previous clubbed locations along with the users going to the previous clubbed locations;

dynamically allocating each user from the first set and second set of users to the identified one or more vehicles based on (i) one or more social constraints, and (ii) one or more constraints associated with the identified one or more vehicles, wherein the one or more social constraints comprises:

(i) at least one user being identified as a female user having at least one of (a) last drop, and (b) a first pick up;

(ii) at least one user being identified as a male user from the first set of users or the second set of users for accompanying with the female user having the last drop; and (iii) at least one security personnel being identified in addition to number of users for an identified vehicle, wherein the at least one security personnel is identified when the male user is not available, and wherein the one or more constraints associated with the identified one or more vehicles comprise:

restrictive access to one or more locations based on size of the identified one or more vehicles; and pick up and drop timing-based selection of one or more vehicles, from and to the one or more locations; and generating, a trip schedule for the identified one or more vehicles, based on the allocation of the first set of users and the second set of users into a corresponding vehicle from the identified one or more vehicles, thereby providing self-learning capability which ensures dynamic assignment of the first set of users and the second set of users to the identified one or more vehicles and vehicle utilization in real-time, wherein the trip schedule is generated by adaptively learning an association of the one or more locations with the identified first location and dynamically assigning the first set of users and the second set of users to the identified one or more vehicles based on the association.

* * * * *